(12) United States Patent
Maidanchuk et al.

(10) Patent No.: US 12,373,043 B2
(45) Date of Patent: Jul. 29, 2025

(54) OPTICAL PEN

(71) Applicant: Samsung Display Co., Ltd., Yongin-Si (KR)

(72) Inventors: Ivan Maidanchuk, Yongin-si (KR); Jin Yong Sim, Yongin-si (KR); Chang Min Park, Yongin-si (KR); Kyu Shik Shin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/396,717

(22) Filed: Dec. 27, 2023

(65) Prior Publication Data

US 2024/0338087 A1     Oct. 10, 2024

(30) Foreign Application Priority Data

Apr. 5, 2023   (KR) .................. 10-2023-0045002

(51) Int. Cl.
   *G06F 3/03*     (2006.01)
   *G06F 3/0354*   (2013.01)
   *G06F 3/038*    (2013.01)

(52) U.S. Cl.
   CPC ...... *G06F 3/03545* (2013.01); *G06F 3/03542* (2013.01); *G06F 3/0386* (2013.01)

(58) Field of Classification Search
   None
   See application file for complete search history.

(56) References Cited

U.S. PATENT DOCUMENTS

2014/0166851 A1*  6/2014  Kim ............... G06F 3/03545
                                              362/249.1
2017/0212639 A1*  7/2017  Hsieh ............... G06F 3/0421

FOREIGN PATENT DOCUMENTS

| CN | 1804770 A | 7/2006 |
|----|-----------|--------|
| JP | 2010-026693 A | 2/2010 |
| KR | 10-2010-0137433 A | 12/2010 |
| KR | 10-2047021 B1 | 11/2019 |
| KR | 10-2213541 B1 | 2/2021 |
| WO | 2009096886 A1 | 8/2009 |

* cited by examiner

*Primary Examiner* — Joseph R Haley
(74) *Attorney, Agent, or Firm* — Innovation Counsel LLP

(57) ABSTRACT

An optical pen includes a body, a protrusion connected to the body and protruding in a first direction, a first light source configured to output light in the first direction, a second light source configured to output light in the first direction, a third light source configured to output light in a second direction crossing the first direction, a light sensor configured to receive external light; and a power controller configured to separately control power of the first light source and power of the third light source.

20 Claims, 9 Drawing Sheets

OPTICAL PEN

CROSS-REFERENCE TO RELATED APPLICATIONS

This application claims priority to Korean Patent Application No. 10-2023-0045002, filed on, Apr. 5, 2023, and all the benefits accruing therefrom under 35 U.S.C. § 119, the content of which in its entirety is herein incorporated by reference.

BACKGROUND

1. Field

The disclosure relates to an optical pen, and more particularly, to an optical pen that outputs and receives light.

2. Description of the Related Art

Recently, technologies capable of writing a letter, a picture, and the like on a display panel using a pen have been developed. The above-described technologies may detect a position of the pen through various methods such as sensing pressure, light, or capacitance of a touch screen. A method of detecting the position of the pen using light may sense the position of the pen by outputting light from the pen and receiving reflected light that was output from the pen and reflected back to the pen. However, in the method using light, a sensed area (that is, the area that reflects the light applied to a light sensor of the pen) may apply more or less of the incident light to the light sensor depending on an orientation (for example, an inclination angle, a rotation angle, or the like) of the pen. This may result in sensing that is nonuniform over the range orientations at which the pen may be used.

SUMMARY

An object of the disclosure is to provide an optical pen that uniformly senses a sensed area throughout a range of orientations at which the optical pen may be used.

In order to achieve an object of the disclosure, according to embodiments of the disclosure, an optical pen includes a body, a protrusion connected to the body and protruding in a first direction, a first light source configured to output light in the first direction, a second light source configured to output light in the first direction, a third light source configured to output light in a second direction crossing the first direction, a light sensor configured to receive external light; and a power controller configured to separately control power of the first light source and power of the third light source.

In an embodiment, the light sensor may be disposed between the first light source and the second light source.

In an embodiment, the power controller may control the power of the first light source and the power of the third light source based on an inclination angle of the body.

In an embodiment, the power controller may decrease the power of the first light source as the inclination angle of the body increases.

In an embodiment, the power of the first light source may have a minimum value when the inclination angle of the body is a reference inclination angle.

In an embodiment, the power controller may increase the power of the third light source as the inclination angle of the body increases.

In an embodiment, the power of the third light source may have a maximum value when the inclination angle of the body is a reference inclination angle.

In an embodiment, the power controller may separately control power of the second light source and the power of the third light source.

In an embodiment, the power controller may control the power of the first light source, the power of the second light source, and the power of the third light source based on an inclination angle of the body.

In an embodiment, the power controller may decrease the power of the first light source and the power of the second light source as the inclination angle of the body increases.

In an embodiment, the power controller may separately control the power of the first light source and power of the second light source.

In an embodiment, the power controller may control the power of the first light source and the power of the second light source based on a rotation angle of the body.

In an embodiment, the first light source may be adjacent to the light sensor in a third direction crossing the first direction, the second light source may be adjacent to the light sensor in a direction opposite to the third direction, and the power of the first light source may increase as the rotation angle of the body of a fourth direction increases.

In an embodiment, the power of the first light source may have a maximum value when the rotation angle of the body in the fourth direction is a reference rotation angle and may have a minimum value when the rotation angle of the body of a direction opposite to the fourth direction is the reference rotation angle.

In an embodiment, the power controller may decrease the power of the second light source as the rotation angle of the body in the fourth direction increases.

In an embodiment, the power of the second light source may have a minimum value when the rotation angle of the body in the fourth direction is a reference rotation angle and may have a maximum value when the rotation angle of the body of a direction opposite to the fourth direction is the reference rotation angle.

In an embodiment, the body may include a transmission surface through which the light output from the first light source, the light output from the second light source, and the light output from the third light source are transmitted.

In order to achieve an object of the disclosure, according to embodiments of the disclosure, an optical pen includes a body, a protrusion connected to the body and protruding in a first direction, a first light source configured to output light in the first direction, a second light source configured to output light in the first direction, a third light source configured to output light in a second direction crossing the first direction, a light sensor configured to receive external light, and a power controller configured to separately control power of the first light source and power of the second light source.

In an embodiment, the power controller may control the power of the first light source and the power of the second light source based on a rotation angle of the body.

In an embodiment, the first light source may be adjacent to the light sensor in a third direction, the second light source may be adjacent to the light sensor in a direction opposite to the third direction, the power of the first light source may increase as the rotation angle of the body in the fourth direction increases, and the power of the second light source may decrease as the rotation angle of the body in the fourth direction increases.

The optical pen according to embodiments of the disclosure may minimize sensing non-uniformity by controlling the first light source and the second light source separately of the third light source so that the amount of light that a sensed area may reflect to the light sensor is less dependent on the orientation of the optical pen.

The optical pen according to an embodiment of the disclosure may minimize non-uniformity of the sensed area according to the rotation angle of the body of the optical pen by independently controlling the first light source and the second light source.

However, an effect of the disclosure is not limited to the above-described effect, and embodiments of the present disclosure may be variously expanded within a range that does not deviate from the spirit and scope of the disclosure.

BRIEF DESCRIPTION OF THE DRAWINGS

The above and other features of the disclosure will become more apparent by describing in further detail embodiments thereof with reference to the accompanying drawings.

DETAILED DESCRIPTION OF THE EMBODIMENT

Figure 1:
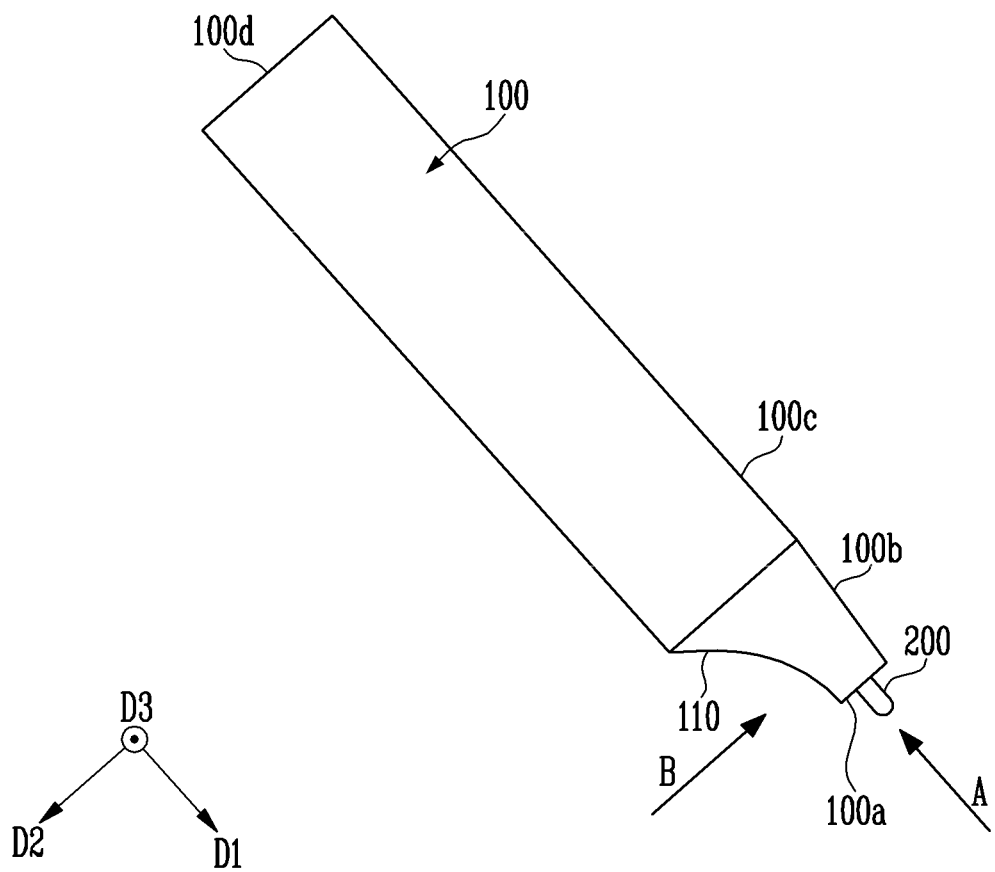
FIG. 1 is a diagram illustrating an optical pen according to an embodiment of the disclosure.

Hereinafter, an embodiment according to the disclosure is described in detail with reference to the accompanying drawings. It should be noted that in the following description, only portions necessary for understanding an operation according to the disclosure are described, and descriptions of other portions are omitted in order not to obscure the subject matter of the disclosure. In addition, the disclosure may be embodied in other forms without being limited to the embodiment described herein. However, the embodiment described herein is provided to describe in detail enough to allow those skilled in the art to which the disclosure belongs to easily implement the technical spirit of the disclosure.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Terms such as first and second may be used herein to describe various components, but the components are not limited to these terms. These terms are used to distinguish one component from another component. Therefore, a first component may alternatively be referred to as a second component or any other designation in a range without departing from the scope disclosed herein.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "over" or "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to the specific shapes shown, and should be interpreted as including, for example, changes in shapes that occur as a result of manufacturing. As described above, the shapes shown in the drawings may not show actual shapes of areas of a device, and the present embodiments are not limited thereto.

FIG. 1 shows an optical pen according to an embodiment of the disclosure.

Referring to FIG. 1, the optical pen may include a body 100 and a protrusion 200.

The body 100 may include a first surface 100a, a second surface 100b, a third surface 100c, a fourth surface 100d, and a transmission surface 110. The protrusion 200 may be connected to the first surface 100a. The protrusion 200 may protrude in a first direction D1 from the first surface 100a. For example, the protrusion 200 may be a nib of the optical pen. For example, the protrusion 200 may be a portion that a user contacts a writing surface for writing a letter, drawing a picture, and the like.

Here, the writing surface may be a use object of the optical pen. For example, the writing surface may be a surface on which a letter, a picture, and the like are written with the optical pen, such as paper and a display panel.

The optical pen may be an input device of a display device. For example, the user may write a letter, draw a picture, and the like on the display panel using the protrusion 200 of the optical pen, the optical pen may provide to the display device information such as a position and an angle of the optical pen. In one example, the display device provides information to an electronic device through a light sensor 400 of FIG. 2 to be described later, and an electronic device may display the letter, the picture, and the like written or drawn by the user on the display device.

In an embodiment, an opening through which an ink comes out may be formed in the protrusion 200. In this case, the user may write a letter, draw a picture, and the like on a paper or the like by using the protrusion 200 of the optical pen. When writing on paper of the like, information such as the position and the angle of the optical pen may be provided to an electronic device through the light sensor 400 of FIG. 2 to be described later, and the electronic device may convert the letter, the picture, and the like into data.

The second surface 100*b* of the body 100 may be connected to the first surface 100*a* and the third surface 100*c*. In an embodiment, the second surface 100*b* may have an inclined shape to improve the feel of the optical pen in a user's hand. For example, the second surface 100*b* may form an inclination descending from the third surface 100*c* to the first surface 100*a*.

A first end of the third surface 100*c* may be connected to the second surface 100*b* and the transmission surface 110. A second end of the third surface 100*c* may be connected to the fourth surface 100*d*.

Figure 2:
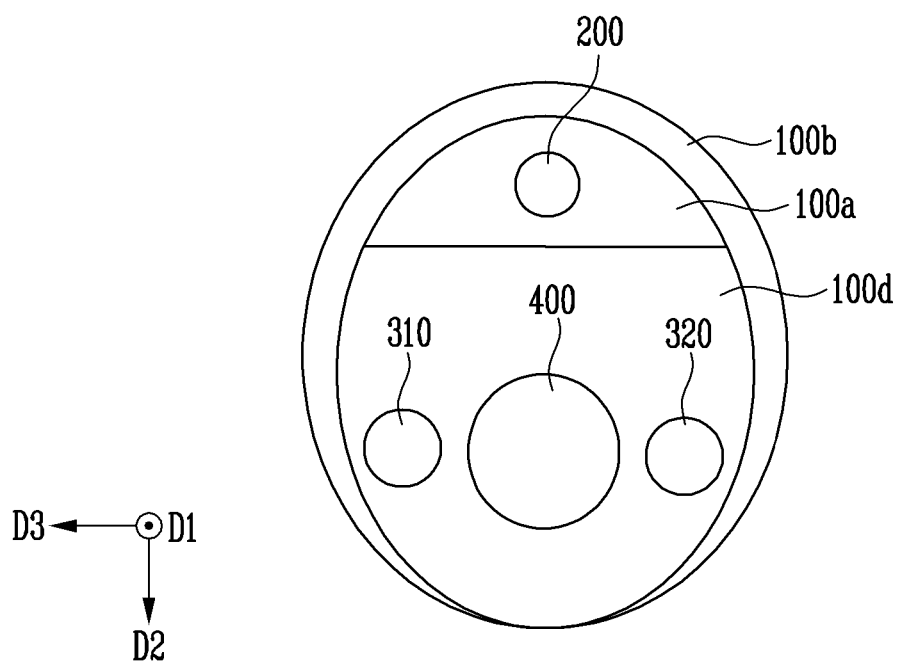
FIG. 2 is a diagram illustrating an example of a body of the optical pen of FIG. 1 when viewed from an A direction.
Figure 3:
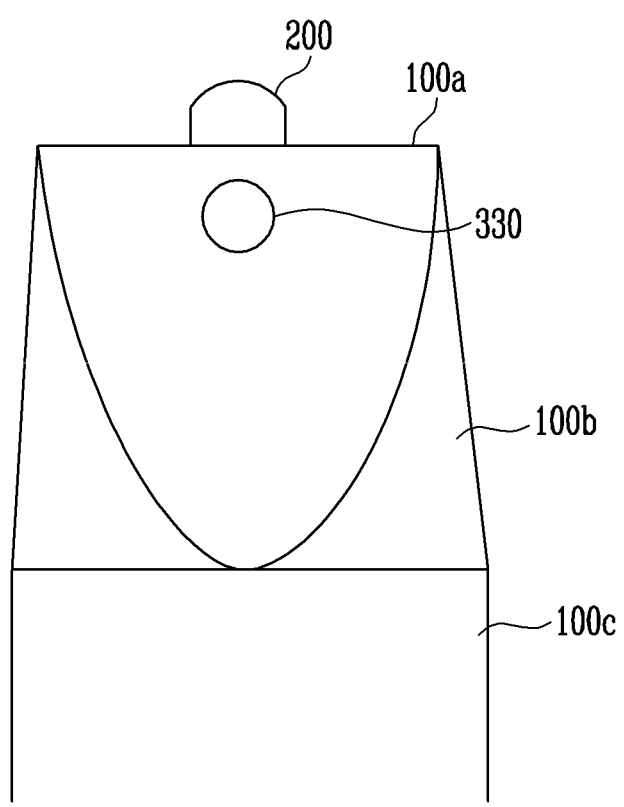
FIG. 3 is a diagram illustrating an example of a portion of the body of FIG. 1 when viewed from a B direction.

The body 100 may include the transmission surface 110 through which light output from a first light source 310 of FIG. 2, light output from a second light source 320 of FIG. 2, and light output from a third light source 330 of FIG. 3 are transmitted. For example, the transmission surface 110 may be formed of a material through which light is transmitted.

An optical pen in accordance with the disclosure is not limited to having a shape of the body 100. For example, the body 100 may be configured of six or more surfaces or four or less surfaces. The body 100 could include portions formed of different materials, and additional portions or structures for convenience of use of the optical pen may be added to the body 100.

FIG. 2 is a diagram illustrating an example of the body 100 of FIG. 1 viewed from an A direction, and FIG. 3 is a diagram illustrating an example of the body 100 of FIG. 1 viewed from a B direction.

The A direction may be parallel to a first direction D1. The B direction may be parallel to a second direction D2.

FIGS. 2 and 3 are diagrams in which the transmission surface 110 is removed for convenience of description. Although FIG. 2 illustrates that the fourth surface 100*d* is visible, the fourth surface 100*d* may not be visible due to the configuration or internal components of the optical pen.

Referring to FIGS. 1 to 3, the optical pen may include the first light source 310 outputting light in the first direction D1, the second light source 320 outputting light in the first direction D1, and the third light source 330 outputting light in the second direction D2 crossing the first direction D1.

For example, the first light source 310 and the second light source 320 may be disposed to face the first direction D1. For example, the third light source 330 may be disposed to face the second direction D2.

In an embodiment, the transmission surface 110 may overlap the first light source 310 and the second light source 320 when the optical pen is viewed from the A direction of FIG. 1. In an embodiment, the transmission surface 110 may overlap the third light source 330 when the optical pen is viewed from the B direction of FIG. 1. For example, a width of the transmission surface 110 may decrease from a portion where the transmission surface 110 connects to the first surface 100*a* to a portion where the transmission surface 110 connects to the third surface 100*c*. However, the disclosure is not limited to any particular shape of the transmission surface 110.

The optical pen may reduce non-uniformity in sensing of a sensed area (that is, an area that reflects light received from the optical pen back to the light sensor 400 in the optical pen). In particular, the reflected light applied to the light sensor 400 may vary according to an orientation or angle (for example, an inclination angle, a rotation angle, or the like) of the body 100 of the optical pen, but by including the third light source 330 facing a direction different from that of the first light source 310 and the second light source 320, the non-uniformity may be reduced.

In an embodiment, each of the first light source 310, the second light source 320, and the third light source 330 may include a light emitting diode (LED), and the light output from the first light source 310, the second light source 320, and the third light source 330 may be infrared light. However, the disclosure is not limited to specific types of the light sources 310, 320, and 330 or a specific type of the light.

The optical pen may include the light sensor 400 receiving external or incident light including the reflected light. The light sensor 400 may be implemented as a photodiode, a phototransistor, an image sensor, or the like. However, the disclosure is not limited to a specific type of light sensor 400.

The light sensor 400 may be disposed between the first light source 310 and the second light source 320. For example, the first light source 310 may be adjacent to the light sensor 400 in the third direction D3 crossing the first direction D1, and the second light source 320 may be adjacent to the light sensor 400 in a direction opposite to the third direction D3.

In an embodiment, the optical pen may output light through the first light source 310, the second light source 320, and the third light source 330. The light output through the first light source 310, the second light source 320, and the third light source 330 may be reflected from a surface (for example, a display panel, a paper, or the like), and thus reflected light may be generated. In addition, the light sensor 400 may receive and measure the reflected light to sense the position, the angle, and the like of the optical pen, and the light sensor 400 may provide information such as the position, the angle, and the like of the pen to an external electronic device. The electronic device may receive information such as the position, the angle, and the like of the optical pen and calculate the letter, the picture, and the like written or drawn by the user.

Figure 4:
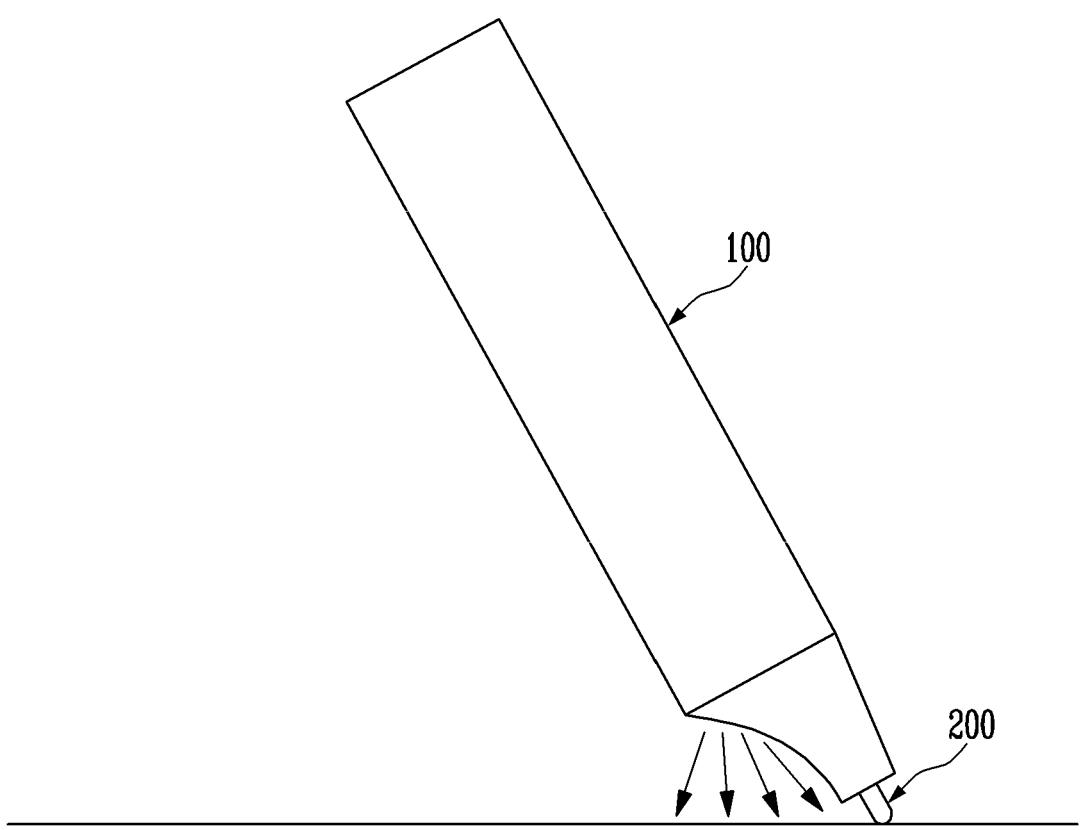
FIG. 4 is a diagram illustrating an example in which the optical pen of FIG. 1 outputs light through a first light source and a second light source.
Figure 5:
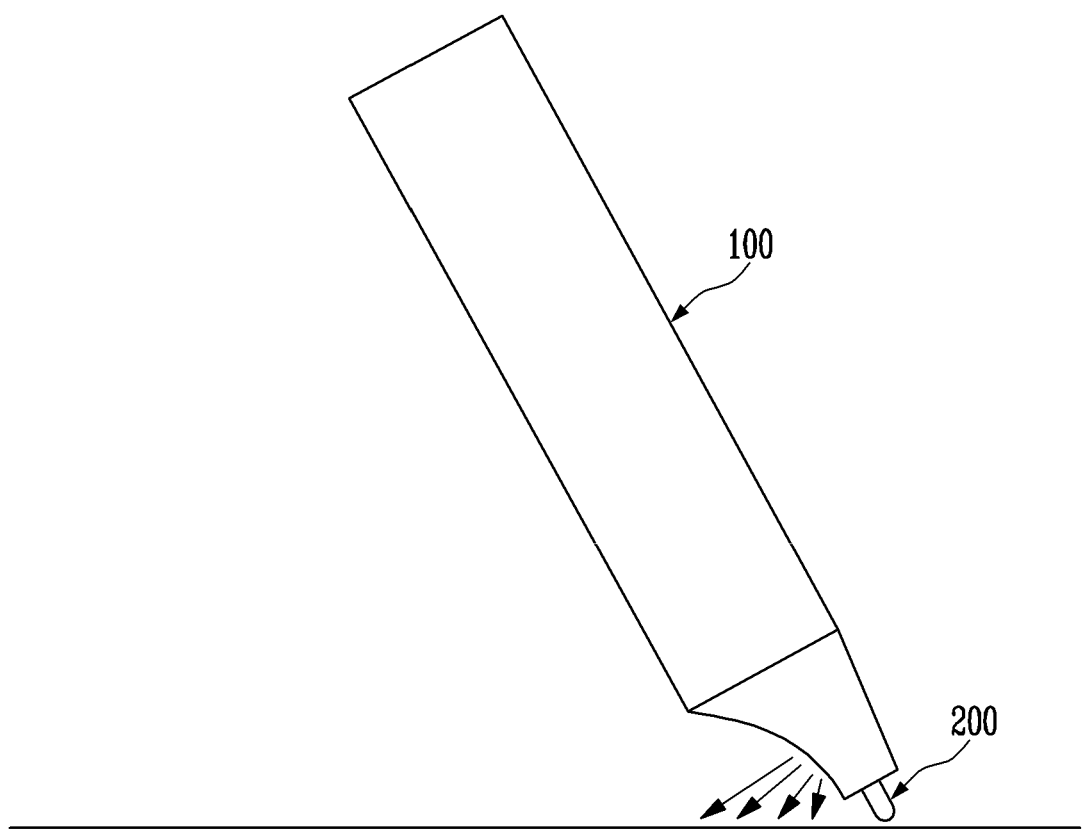
FIG. 5 is a diagram illustrating an example in which the optical pen of FIG. 1 outputs light through a third light source.

FIG. 4 shows an example in which the optical pen of FIG. 1 outputs light through the first light source 310 and the second light source 320, and FIG. 5 is a diagram illustrating an example in which the optical pen of FIG. 1 outputs light through the third light source 330.

Referring to FIGS. 1, 2, and 4, the first light source 310 and the second light source 320 may output light in a direction parallel to the protrusion 200. In addition, the first light source 310 and the second light source 320 may output not only the light in the direction parallel to the protrusion 200 but also light at an angle partially deviating from the direction parallel to the protrusion 200.

Referring to FIGS. 1, 3, and 5, the third light source 330 may output light in a direction crossing that of the light of the first light source 310 and the second light source 320. In addition, the third light source 330 may output not only the light in the direction crossing that of the light of the first light source 310 and the second light source 320, but also light at an angle partially deviating from the direction crossing that of the first light source 310 and the second light source 320.

Referring to FIGS. 1 to 5, the first light source 310 and the second light source 320 may output the light in the direction crossing that of the light output from the third light source 330. Accordingly, the optical pen may output light in various directions, and an effect of the angle of the body 100 of the optical pen on a size of an area to which the light is irradiated may be reduced.

Figure 6:
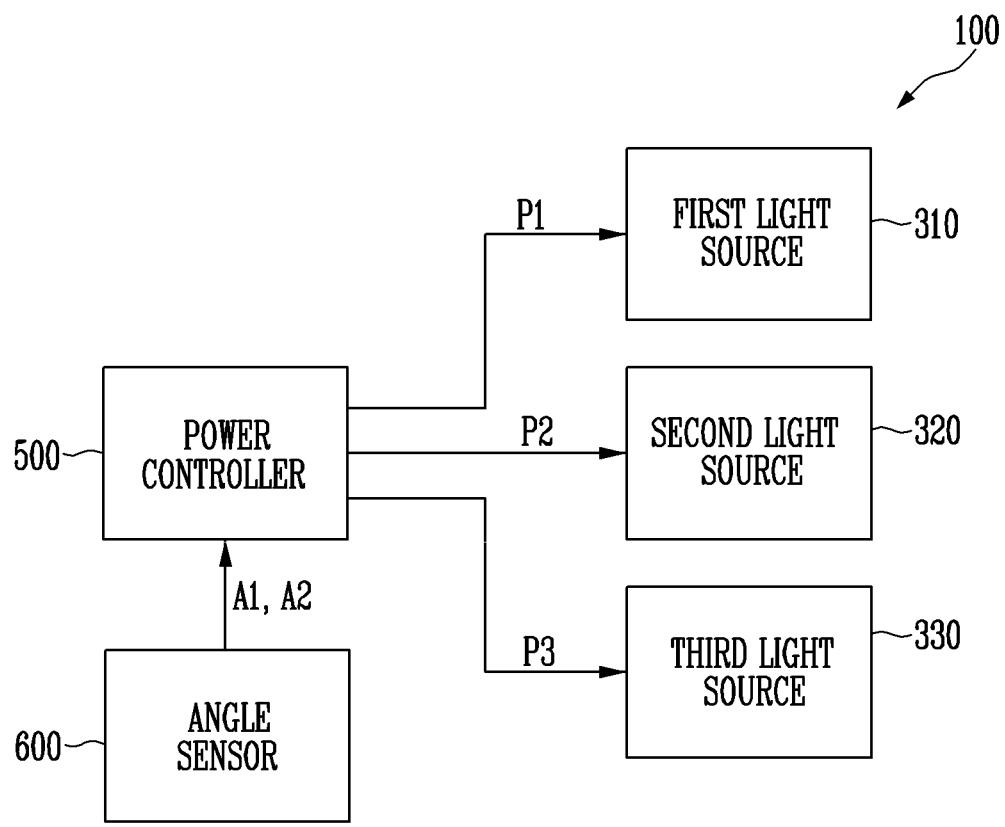
FIG. 6 is a block diagram illustrating an example of light sources in the body of the optical pen of FIG. 1.

FIG. 6 is a block diagram illustrating an example of electrical systems that the body 100 of the optical pen of FIG. 1 may contain.

FIG. 6 omits the light sensor 400 and configurations related thereto for convenience of description.

Referring to FIG. 6, the body 100 may include a power controller 500 and an angle sensor 600.

The power controller 500 may provide respective power P1, P2, and P3 to the first light source 310, the second light source 320, and the third light source 330. An intensity of the light output from the first light source 310, the second light source 320, or the third light source 330 may increase as the corresponding one of power P1, P2, and P3 increases. The power controller 500 may adjust the respective intensities of the light output from the first light source 310, the second light source 320, and the third light source 330 by controlling the power P1, P2, and P3.

In various embodiments of the disclosure, the power controller 500 may be implemented in the form of hardware, software, firmware, or an application specific integrated circuit (ASIC).

The angle sensor 600 may measure one or more orientation angles (for example, an inclination angle A1, a rotation angle A2, or the like) of the body 100 of the optical pen. For example, the angle sensor 600 may be a gyro sensor.

The angle sensor 600 may provide the measured inclination angle A1 and rotation angle A2 of the body 100 of the optical pen to the power controller 500. The power controller 500 may control the power P1, P2, and P3 of the respective first light source 310, second light source 320, and third light source 330 based on the inclination angle A1 and the rotation angle A2 of the body 100. A detailed description thereof is given later.

Figure 7:
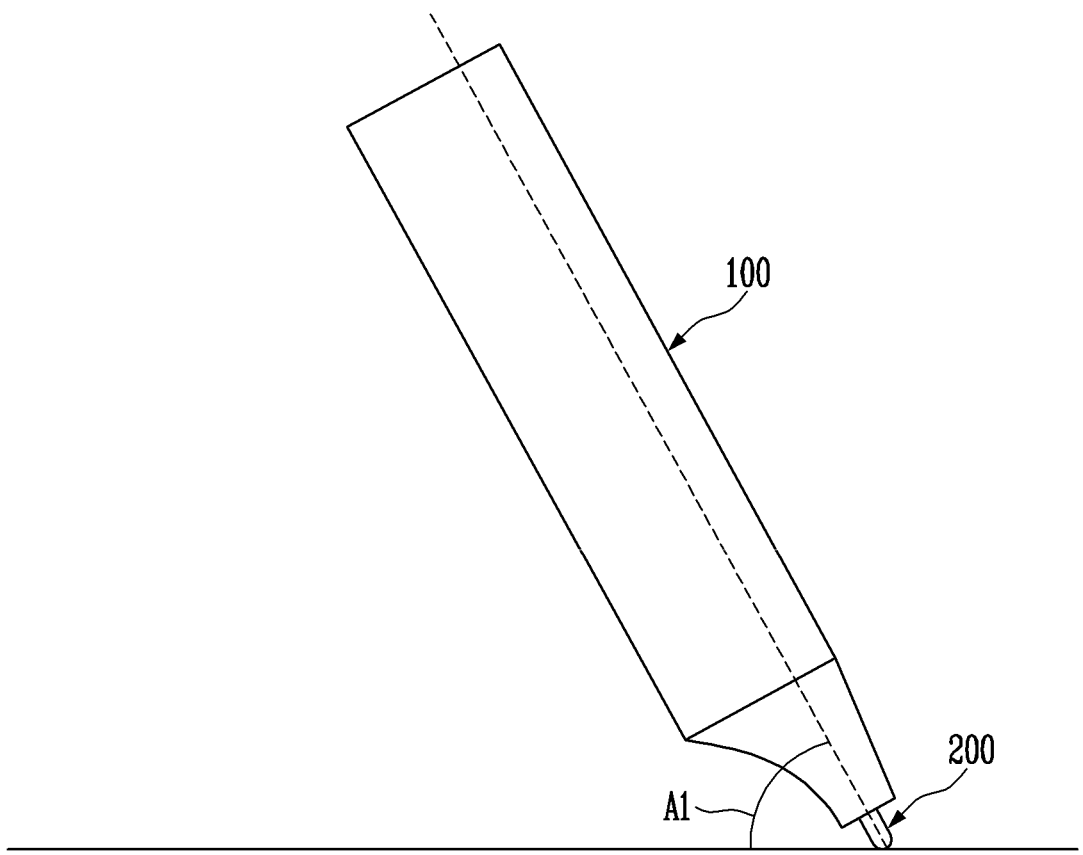
FIG. 7 is a diagram illustrating an inclination angle of the body during use of the optical pen of FIG. 1.
Figure 8:
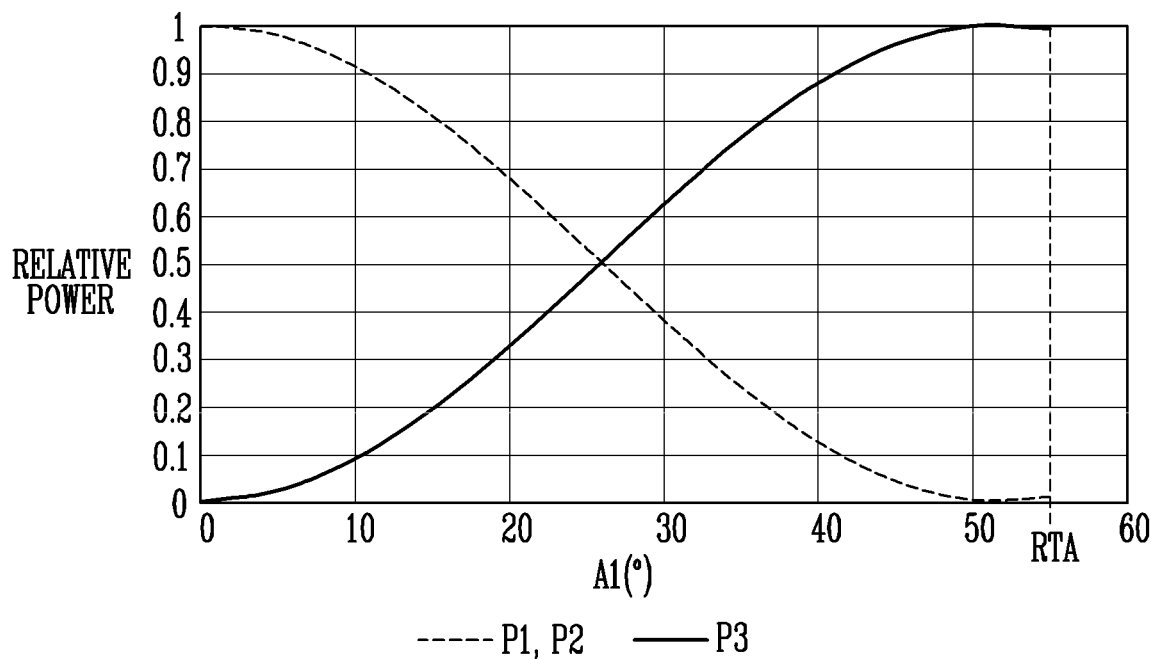
FIG. 8 is a graph illustrating an example in which the optical pen of FIG. 1 controls respective power of the first light source, second light source, and third light source.

FIG. 7 is a diagram illustrating the inclination angle A1 of the body 100, and FIG. 8 is a graph illustrating an example in which the optical pen of FIG. 1 controls the power P1, P2, and P3 of the respective first light source 310, second light source 320, and third light source 330 according to the inclination angle A1.

An x-axis of FIG. 8 represents the inclination angle A1 of the body 100, and a y-axis represents a relative strength of the power P1, P2, and P3.

Referring to FIGS. 2, 4, 5, and 6 to 8, the power controller 500 may separately control the power P1 of the first light source 310 and the power P3 of the third light source 330. The power controller 500 may separately control the power P2 of the second light source 320 and the power P3 of the third light source 330.

For example, the power P1 of the first light source 310 may be different from the power P3 of the third light source 330. For example, the power P2 of the second light source 320 may be different from the power P3 of the third light source 330.

The power controller 500 may control the power P1 of the first light source 310, the power P2 of the second light source 320, and the power P3 of the third light source 330 based on the inclination angle A1 of the body 100. As illustrated in FIG. 7, the inclination angle A1 of the body 100 may be an angle formed between the body 100 and a writing surface.

The power P1 of the first light source 310 may decrease as the inclination angle A1 of the body 100 increases. The power P2 of the second light source 320 may decrease in the same proportion as the power P1, as the inclination angle A1 of the body 100 increases. The power P3 of the third light source 330 may increase as the inclination angle A1 increases.

In an embodiment, the power P1 of the first light source 310 may have a minimum value when the inclination angle A1 of the body 100 is a preset reference inclination angle RTA. In an embodiment, the power P2 of the second light source 320 may have a minimum value when the inclination angle A1 of the body 100 is the preset reference inclination angle RTA. In an embodiment, the power P3 of the third light source 330 may have a maximum value when the inclination angle A1 of the body 100 is the preset reference inclination angle RTA.

When the inclination angle A1 of the body 100 exceeds the reference inclination angle RTA, the intensity of the reflected light reaching the light sensor 400 may be small, and thus sensing the position, the angle, or the like of the optical pen may be difficult. Therefore, a range of the inclination angle A1 in which the optical pen controls the respective power P1, P2, and P3 of the first light source 310, the second light source 320, and the third light source 330 may extend to (and end at) the reference inclination angle RTA.

In the example illustrated in FIG. 8, the power P1 of the first light source 310 may decrease as the inclination angle A1 increases from 0° to the reference inclination angle RTA, the power P2 of the second light source 320 may decrease as the inclination angle A1 increases from 0° to the reference inclination angle RTA, and the power P3 of the third light source 330 may increase as the inclination angle A1 increases from 0° to the reference inclination angle RTA.

When the first light source 310 and the second light source 320 are disposed to face the first direction D1, as the inclination angle A1 decreases, the light output from the first light source 310 and the second light source 320 that may be reflected from the sensed area and applied to the light sensor 400 may decrease, i.e., a higher percentage of the reflected light is directed away from the light sensor 400. In addition, when the first light source 310 and the second light source 320 are disposed to face the first direction D1, as the inclination angle A1 increases, the light output from the first light source 310 and the second light source 320 that may be reflected and applied to the light sensor 400 may increase.

On the other hand, when the third light source 330 is disposed to face the second direction D2, as the inclination angle A1 decreases, the light output from the third light source 330 that may be reflected back and applied to the light source 400 may increase. In addition, when the third light source 330 is disposed to face the second direction D2, as the inclination angle A1 increases, the light output from the third light source 330 that may be reflected back and applied to the light source 400 may decrease.

Therefore, the power controller 500 may decrease an intensity of the light output from each of the first light source 310 and the second light source 320 as the inclination angle A1 of the body 100 increases and may increase an intensity of the light output from the third light source 330 as the inclination angle A1 of the body 100 increases, thereby uniformly maintaining the reflected light received by the light sensor 400. Accordingly, the optical pen may minimize or reduce sensing non-uniformity that changes in the inclination angle A1 of the body 100 of the optical pen might otherwise cause.

In the present embodiment, the power of the first light source 310 and the power of the second light source 320 are illustrated as being the same when the rotation angle A2 is 0°, but the disclosure is not limited thereto.

Figure 9:
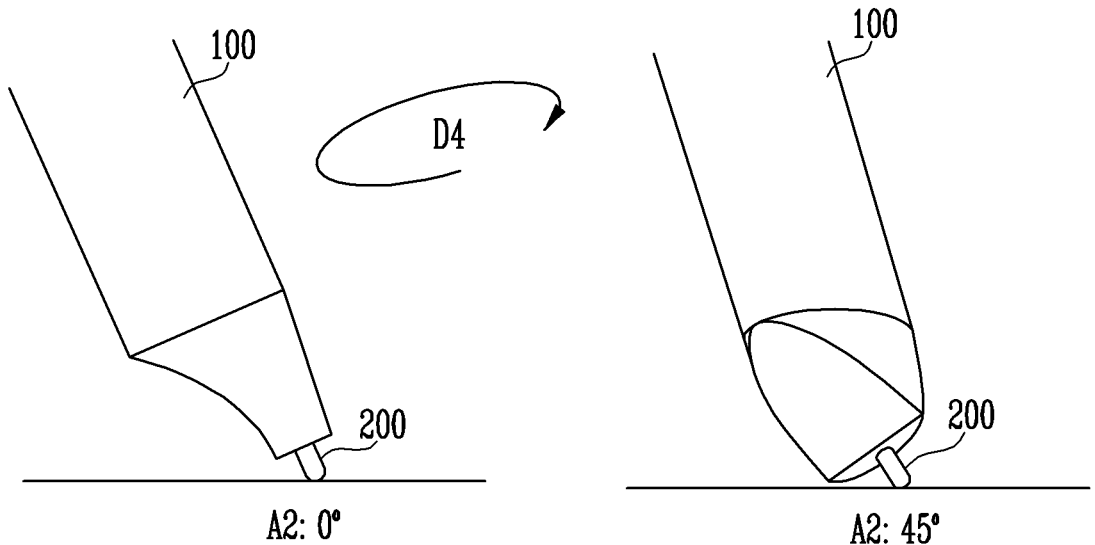
FIG. 9 is a diagram illustrating a rotation angle of the body during uses of the optical pen of FIG. 1.
Figure 10:
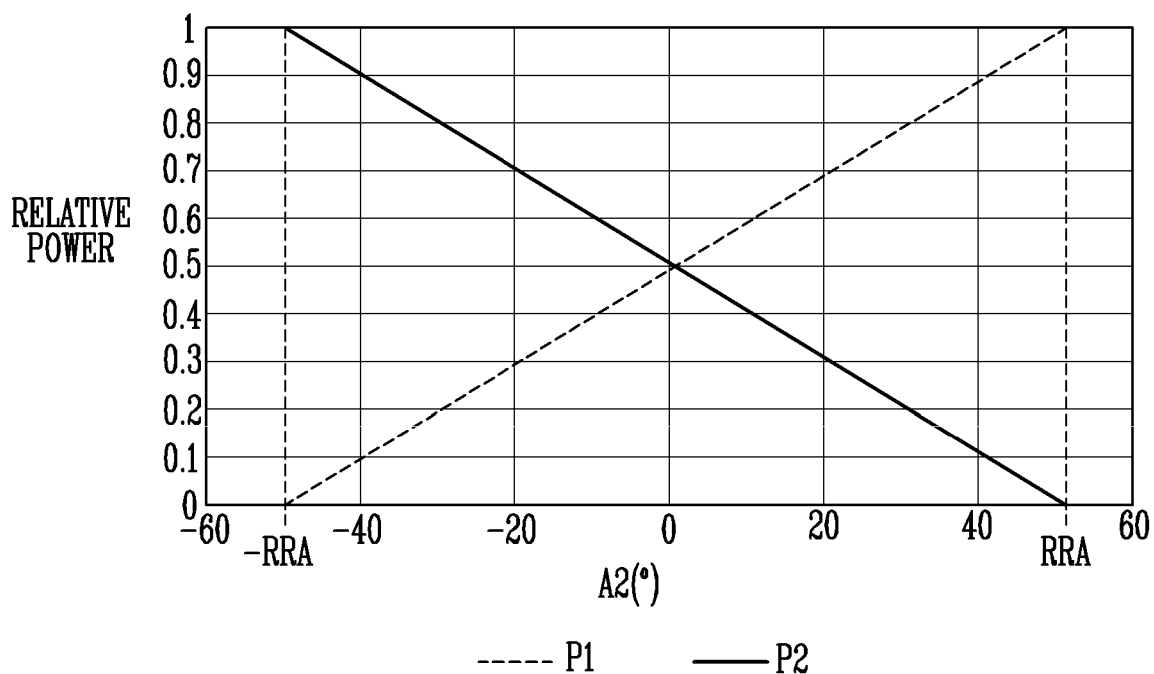
FIG. 10 is a graph illustrating an example in which the optical pen of FIG. 1 controls the respective power of the first light source and second light source.

FIG. 9 is a diagram illustrating the rotation angle A2 of the body 100, and FIG. 10 is a graph illustrating an example in which the optical pen of FIG. 1 controls the power P1 and P2 of the respective first light source 310 and second light source 320.

An x-axis of FIG. 10 represents the rotation angle A2 of the body 100 in a fourth direction D4, and a y-axis of FIG. 10 represents a relative strength of the power.

FIGS. 9 and 10 illustrate an example in which the fourth direction D4 is a counterclockwise direction, a left portion of FIG. 9 shows the optical pen 100 when the rotation angle A2 is 0°, and a right portion of FIG. 9 shows the optical pen 100 when the rotation angle A2 is 45°.

Referring to FIGS. 2, 4, 6, 9, and 10, the power controller 500 may separately control the power P1 of the first light source 310 and the power P2 of the second light source 320. For example, the power P1 of the first light source 310 may be different from the power P2 of the second light source 320.

The power controller 500 may control the power P1 of the first light source 310 relative to the power P2 of the second light source 320 based on the rotation angle A2 of the body 100. As illustrated in FIG. 9, the rotation angle A2 may be an angle at which the body 100 is rotated about the protrusion 200 or about an axis of the body 100.

The power P1 of the first light source 310 may increase as the rotation angle A2 of the body 100 in the fourth direction D4 increases. The power P2 of the second light source 320 may decrease as the rotation angle A2 of the body 100 in the fourth direction D4 increases.

In an embodiment, the power P1 of the first light source 310 may have a maximum value when the rotation angle A2 of the body 100 in the fourth direction D4 is a preset reference rotation angle RRA, and may have a minimum value when the rotation angle A2 of the body 100 in a direction opposite to the fourth direction D4 (that is, a clockwise direction) is the reference rotation angle –RRA.

When the rotation angle A2 of the body 100 exceeds the reference rotation angle RRA, the intensity of the reflected light reflected back and applied to the light sensor 400 may be low, and thus sensing the position, the angle, or the like of the optical pen may be difficult. Therefore, a range of the rotation angle A2 in which the optical pen controls the power P1 and P2 of the respective first light source 310 and second light source 320 may be from the negative reference rotation angle–RRA to the positive reference rotation angle RRA.

In an embodiment, the power P2 of the second light source 320 may have a minimum value when the rotation angle A2 of the body 100 in the fourth direction D4 is the reference rotation angle RRA, and may have a maximum value when the rotation angle A2 of the body 100 in the direction opposite to the fourth direction D4 (that is, the clockwise direction) is the reference rotation angle RRA.

For example, as illustrated in FIG. 10, the power P1 of the first light source 310 may be increased as the rotation angle A2 in the fourth direction D4 increases from a negative reference rotation angle–RRA (that is, a reference rotation angle RRA in the direction opposite to the fourth direction D4) to a positive reference rotation angle RRA, and the power P2 of the second light source 320 may be decreased as the rotation angle A2 in the fourth direction D4 increases from the negative reference rotation angle–RRA (that is, the reference rotation angle RRA in the direction opposite to the fourth direction D4) to the positive reference rotation angle RRA.

When the first light source 310 is adjacent to the light sensor 400 in the third direction D3, as the rotation angle A2 in the fourth direction D4 increases, the light output from the first light source 310 that may be reflected from the sensed area and applied to the light source 400 may decrease. In addition, when the first light source 310 is adjacent to the light sensor 400 in the third direction D3, as the rotation angle A2 of the direction opposite to the fourth direction D4 increases, the light output from the first light source 310 that may be reflected from the sensed area and applied to the light source 400 may increase.

On the other hand, when the first light source 310 is adjacent to the light sensor 400 in the third direction D3, as the rotation angle A2 in the fourth direction D4 increases, the light output from the second light source 320 that may be reflected from the sensed area and applied to the light source 400 may increase. In addition, when the first light source 310 is adjacent to the light sensor 400 in the third direction D3, as the rotation angle A2 of the direction opposite to the fourth direction D4 increases, the light output from the second light source 320 that may be reflected from the sensed area and applied to the light source 400 may be decreased.

Therefore, the power controller 500 may increase the intensity of the light output from the first light source 310 and decrease the intensity of the light output from the second light source 320 as the rotation angle A2 in the fourth direction D4 increases and may decrease the intensity of the light output from the first light source 310 and increase the intensity of the light output from the second light source 320 as the rotation angle A2 the direction opposite to the fourth direction D4 increases, thereby uniformly maintaining the reflected light that the light sensor 400 may receive from the sensed area. Accordingly, the optical pen may minimize sensing non-uniformity caused by changes in the rotation angle A2 of the body 100 of the optical pen.

The disclosure may be applied to a display device and an electronic device including the display device. For example, the disclosure may be applied to a digital TV, a 3D TV, a mobile phone, a smart phone, a tablet computer, a VR device, a PC, a home electronic device, a notebook computer, a PDA, a PMP, a digital camera, a music player, a portable game console, a navigation system, and the like.

Although described with reference to the above embodiments, it will be understood that those skilled in the art can variously modify and change the described embodiments without departing from the spirit and scope of the claims below.

What is claimed is:

1. An optical pen comprising:
   a body;
   a protrusion connected to the body and protruding in a first direction;
   a first light source configured to output light in the first direction;
   a second light source configured to output light in the first direction, the second light source outputting light in a same direction as the first light source;
   a third light source configured to output light in a second direction crossing the first direction;
   a light sensor configured to receive external light; and
   a power controller configured to separately control power of the first light source and power of the third light source.

2. The optical pen according to claim 1, wherein the light sensor is disposed between the first light source and the second light source.

3. The optical pen according to claim 1, wherein the power controller controls the power of the first light source and the power of the third light source based on an inclination angle of the body.

4. The optical pen according to claim 3, wherein the power controller decreases the power of the first light source as the inclination angle of the body increases.

5. The optical pen according to claim 4, wherein the power of the first light source has a minimum value when the inclination angle of the body is a reference inclination angle.

6. The optical pen according to claim 3, wherein the power controller increases the power of the third light source as the inclination angle of the body increases.

7. The optical pen according to claim 6, wherein the power of the third light source has a maximum value when the inclination angle of the body is a reference inclination angle.

8. The optical pen according to claim 1, wherein the power controller separately controls power of the second light source and the power of the third light source.

9. The optical pen according to claim 8, wherein the power controller controls the power of the first light source, the power of the second light source, and the power of the third light source based on an inclination angle of the body.

10. The optical pen according to claim 9, wherein the power controller decreases the power of the first light source and the power of the second light source as the inclination angle of the body increases.

11. The optical pen according to claim 1, wherein the power controller separately controls the power of the first light source and the power of the second light source.

12. The optical pen according to claim 11, wherein the power controller controls the power of the first light source and the power of the second light source based on a rotation angle of the body.

13. The optical pen according to claim 12, wherein
the first light source is adjacent to the light sensor in a third direction crossing the first direction,
the second light source is adjacent to the light sensor in a direction opposite to the third direction, and
the power controller increases the power of the first light source as the rotation angle of the body in a fourth direction increases.

14. The optical pen according to claim 13, wherein the power of the first light source has a maximum value when the rotation angle of the body in the fourth direction is a reference rotation angle and has a minimum value when the rotation angle of the body of in a direction opposite to the fourth direction is the reference rotation angle.

15. The optical pen according to claim 12, wherein the power controller decreases the power of the second light source as the rotation angle of the body in the fourth direction increases.

16. The optical pen according to claim 15, wherein the power of the second light source has a minimum value when the rotation angle of the body in the fourth direction is a reference rotation angle and has a maximum value when the rotation angle of the body in a direction opposite to the fourth direction is the reference rotation angle.

17. The optical pen according to claim 1, wherein the body includes a transmission surface through which the light output from the first light source, the light output from the second light source, and the light output from the third light source are transmitted.

18. An optical pen comprising:
a body;
a protrusion connected to the body and protruding in a first direction;
a first light source configured to output light in the first direction;
a second light source configured to output light in the first direction, the second light source outputting light in a same direction as the first light source;
a third light source configured to output light in a second direction crossing the first direction;
a light sensor configured to receive external light; and
a power controller configured to separately control power of the first light source and power of the second light source.

19. The optical pen according to claim 18, wherein the power controller controls the power of the first light source and the power of the second light source based on a rotation angle of the body.

20. The optical pen according to claim 18, wherein
the first light source is adjacent to the light sensor in a third direction,
the second light source is adjacent to the light sensor in a direction opposite to the third direction,
the power controller increases the power of the first light source as the rotation angle of the body in the fourth direction increases, and
the power controller decreases the power of the second light source as the rotation angle of the body in the fourth direction increases.

* * * * *